United States Patent [19]

Nienaber

[11] Patent Number: 4,723,164
[45] Date of Patent: Feb. 2, 1988

[54] TRI-STATE SYNC TECHNIQUE

[75] Inventor: David K. Nienaber, Des Plaines, Ill.

[73] Assignee: Zenith Electronics Corporation, Glenview, Ill.

[21] Appl. No.: 750,368

[22] Filed: Jun. 28, 1985

[51] Int. Cl.⁴ .............................................. H04N 5/04
[52] U.S. Cl. .................................... 358/148; 358/149
[58] Field of Search ............... 358/150, 151, 152, 148, 358/149, 154, 173, 153; 340/805, 814; 370/112

[56] References Cited

U.S. PATENT DOCUMENTS

| | | | |
|---|---|---|---|
| 3,261,920 | 7/1966 | Aarron | 370/112 |
| 3,816,658 | 6/1974 | Vidovic | 358/149 |
| 3,963,877 | 6/1976 | Miyazaki et al. | 358/148 |
| 4,213,149 | 7/1980 | Janko | 358/148 |
| 4,222,074 | 9/1980 | Breithaupt | 358/150 |
| 4,524,387 | 6/1985 | Tamer | 358/150 |

FOREIGN PATENT DOCUMENTS

| | | | |
|---|---|---|---|
| 933635 | 1/1953 | Fed. Rep. of Germany | 358/148 |
| 0120268 | 9/1980 | Japan | 358/148 |
| 0694725 | 7/1953 | United Kingdom . | |

OTHER PUBLICATIONS

"Television Engineering", by Arvind M. Dhake, Tata McGraw-Hill Publishing Co., 1980, pp. 321-323.

Primary Examiner—James J. Groody
Assistant Examiner—David E. Harvey

[57] ABSTRACT

An apparatus and method is provided for transmitting both horizontal and vertical sync on a single transmission channel in a raster scan display system. Separate, essentially two-state horizontal and vertical sync signals are combined to form a tri-state combined sync signal. In one embodiment, horizontal sync and vertical sync signals are summed to provide a "summation" sync for transmission over a single channel. At a video display station, the vertical sync component is separated by integrating the summed sync signal. Likewise, the horizontal sync component is separated by differentiating the summation sync signal. Additionally, the horizontal sync may be clamped about a desired DC voltage level at the video display station. Horizontal sync information is maintained throughout vertical sync periods and the timing for the horizontal oscillator is preserved so that the horizontal lines immediately following the termination of the vertical sync period are in proper phase as the vertical trace period begins.

14 Claims, 5 Drawing Figures

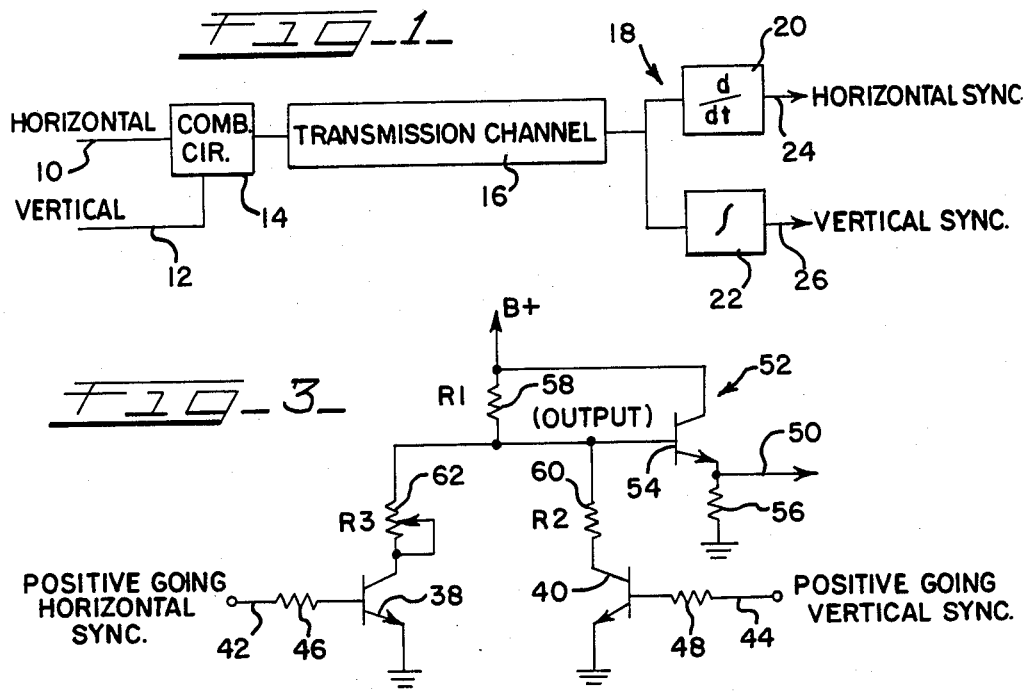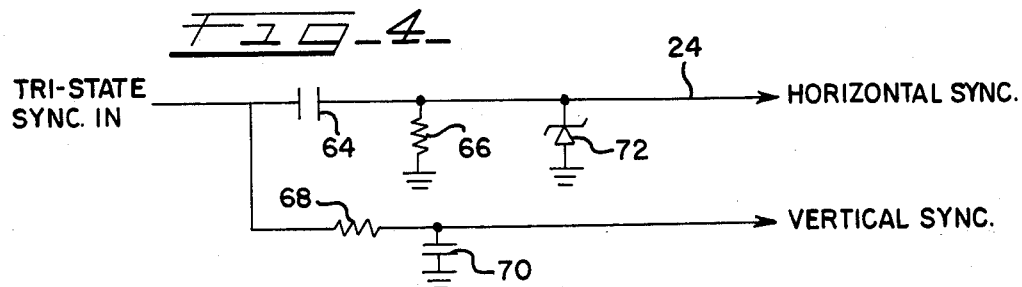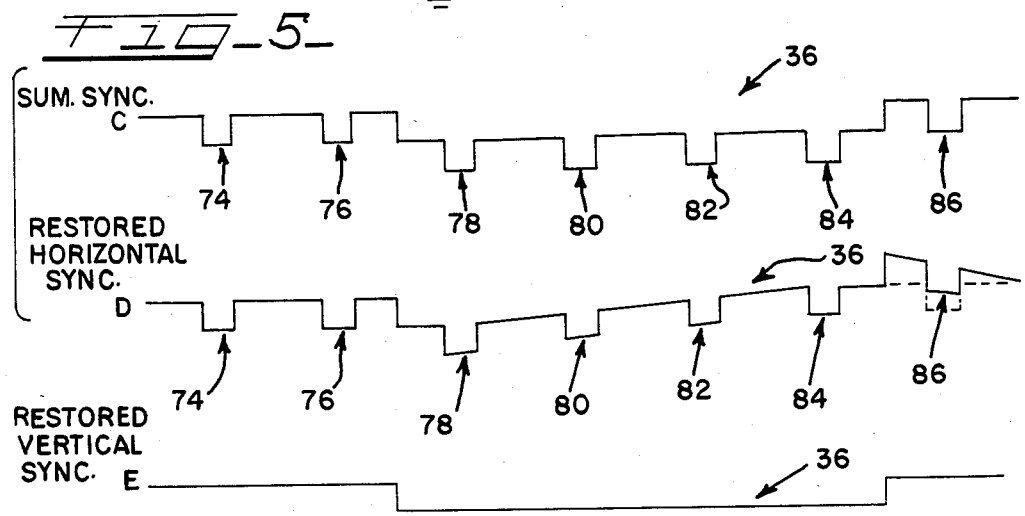

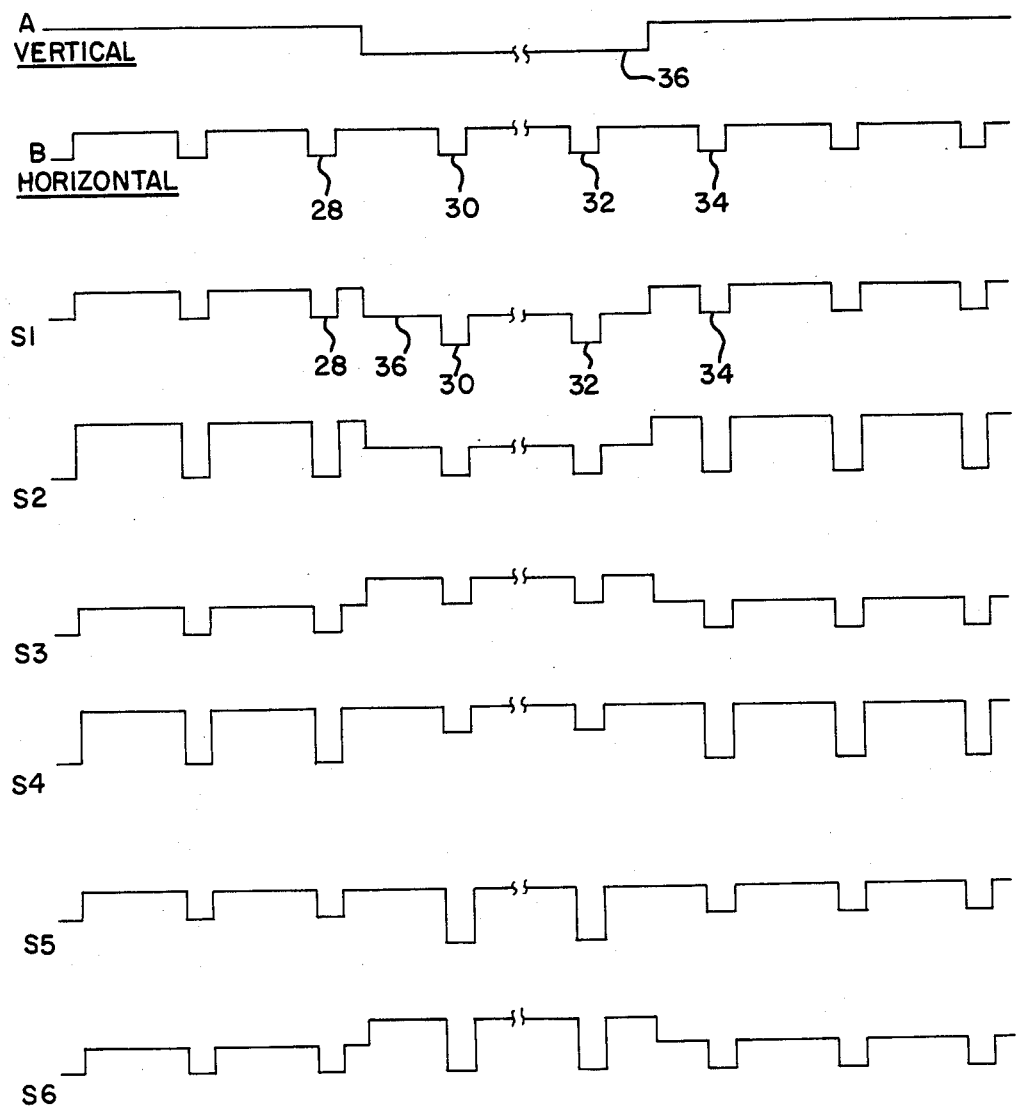

TRI-STATE SYNC TECHNIQUE

BACKGROUND OF THE INVENTION

The present invention relates to improvements in interfacing video displays with video sources, computers and the like, in which non-standard sync signals may typically be used.

Computers, arcade games and the like typically generate vertical sync and horizontal sync signals as separate internal signals which are then transmitted to the appropriate display apparatus. However, sending the horizontal and vertical sync as separate signals requires at least two transmission lines with the resultant extra cost and hardware. Accordingly, it is desirable to transmit all sync information over a single line.

In a standard television system utilizing composite video signals, both horizontal and vertical sync information is superimposed on the video information signal. At the receiving station, the sync information may be extracted in the form of a single, composite sync pulse train bearing both horizontal and vertical sync information. During a vertical sync period and the corresponding vertical retrace, the horizontal timing information is shifted in phase. Accordingly, the horizontal oscillator circuit will typically shift in phase during this period. At the end of the vertical sync period, the horizontal oscillator circuit will reestablish its original timing and lock onto the now correctly phased horizontal sync pulses.

Vertical and horizontal sync typically have been transmitted separately in computer applications so that during the vertical sync period, the horizontal flyback circuitry may keep the video raster scan correctly timed and preserve the picture integrity during the first few horizontal lines at the top of the screen. This is especially desirable in computer graphics, text, and game display applications, because the first few lines may typically contain important information for display. Unlike traditional television systems where a vertical blanking interval may hide any disturbances caused by the vertical sync, in a computer display environment it is desirable to use all available horizontal lines for display.

Thus, although it is desirable to provide vertical and horizontal sync on a single transmission line, it is undesirable to lose or alter the horizontal sync information during the vertical sync interval because of the resultant "recovery" time necessary for the horizontal flyback circuitry to reestablish accurate horizontal timing once the vertical sync period terminates. Accordingly, it is desirable to provide a technique for allowing single line transmission of both horizontal and vertical sync while minimizing the disturbance to horizontal timing introduced by the presence of the vertical sync signal.

Because both the horizontal and the vertical sync signals may be thought of as essentially digital signals with a horizontal or vertical pulse comprising a "1" (or a "0" if negative sync is utilized) and the period between pulses comprising a "0" (or a "1" if negative sync is utilized), standard logic circuitry may be used to combine the two sync signals for transmission on a single line. However, sync information may become lost through such a combination and the sync periods may lose some definition through this means. Ultimately, a combination of the two sync signals through standard logic circuitry may require additional horizontal lines to accomplish the vertical retrace and reestablish the correct timing of the horizontal flyback, which is undesirable in a computer or graphics display system in which every line is valuable.

Accordingly, it is a principal object of the present invention to provide a technique which generally overcomes the deficiencies in the prior art.

It is a primary object of the present invention to provide a technique for summation sync which allows the horizontal and vertical sync information to be transmitted on a single line.

It is still a further object of the present invention to provide single line transmission of horizontal and vertical sync information and minimization of disturbance to the horizontal timing caused by the vertical sync signal.

It is still a further object of the present invention to provide an apparatus and method for implementing the technique of the present invention.

BRIEF DESCRIPTION OF THE FIGURES

The features of the present invention are set forth with particularity in the appended claims. The invention, together with the objects and advantages thereof, may best be understood in reference to the following detailed description taken in conjunction with the drawings in which like reference numerals are used to identify like elements and of which:

FIG. 1 is a block diagram representation of a preferred embodiment of the present invention;

FIG. 2 is a set of waveforms illustrating the original horizontal and vertical sync signals and various multistate sync signals produced in accordance with the present invention;

FIG. 3 is a schematic circuit diagram illustrating one embodiment of a combining circuit for providing desired tri-state sync signals to a single transmission line;

FIG. 4 is a schematic representation of one embodiment of the differentiating and integrating circuitry of a preferred embodiment of the present invention;

FIG. 5 is a set of waveforms illustrating a preferred, transmitted tri-state sync signal and restored horizontal and vertical sync signals.

DETAILED DESCRIPTION OF THE INVENTION

Referring now to FIG. 1, therein is shown a block diagram representation of a preferred embodiment of the present invention. More particularly, a horizontal sync signal is received on a line 10 and a corresponding vertical sync signal is received on a line 12. The horizontal and vertical sync information from lines 10 and 12, respectively, is processed through a combining circuit 14 to form a tri-state sync signal. The resultant combined tri-state sync signal is then transmitted via a transmission channel 16 to an appropriate receiving station 18.

It is envisioned that the horizontal and vertical sync received respectively on lines 10 and 12 will be typically generated internally by a computer or other device with which the present invention may be utilized. The combining circuit 14 may be any suitable device as is well-known in the art. For example, in one embodiment, combining circuit 14 may comprise a summation circuit such as an algebraic summing circuit. Likewise, transmission channel 16 may comprise any acceptable transmission medium, although it is envisioned that transmission channel 16 will typically comprise a single wire or cable.

In the preferred embodiment of the present invention, a display station 18 will typically include a differentiator 20 and an integrator 22. The output of the differentiator 20 on a line 24 will be a restored horizontal sync signal. The output of the integrator 22 on a line 26 will be a restored vertical sync signal.

Referring now to FIG. 2, therein is shown a waveform A which is representational of a typical vertical sync signal which may be received on line 12 at combining circuit 14. Also shown in FIG. 2 is a waveform B which is representational of a horizontal sync signal which may be received at combining circuit 14. Waveform S1 of FIG. 2 then represents the sum of the horizontal and vertical sync signals which may be accomplished when a summing device is utilized for combining circuit 14. More particularly, the negative horizontal sync pulses 28, 30, 32 and 34 of waveform B may be algebraically added together with the longer vertical sync pulse 36 of waveform A to form waveform S1 as shown with the pulses intact as labeled.

It can be seen from FIG. 2, that both the horizontal and vertical sync information is retained with original phase information intact in the combined tri-state sync signal (waveform S1) which is transmitted via channel 16 as a summation of the two original sync signals to the display device 18. This is unlike typical logic combination methods in which the horizontal sync pulses may either be lost or inverted during the vertical sync period defined by vertical sync pulse 36.

The horizontal sync and the vertical sync signals may be thought of as essentially binary signals with the pulses having a "0" state and intermediate times having a "1" state, because at any one time each signal will have one of two possible levels. At any time, two of the three possible levels establish horizontal sync; one level indicates the sync interval, and another indicates the non-sync interval. One or both of the levels used for horizontal sync must be different during the vertical sync period than during the non-vertical sync period so that a change can be detected in order to establish vertical sync. And in order to avoid introducing errors into the horizontal timing, the polarity of the horizontal sync information must be maintained throughout the vertical sync period. That is, if during the non-vertical sync interval the horizontal sync polarity is negative, defined by the sync level being lower than the non-sync level, then the horizontal sync polarity must be negative during the vertical sync interval as well.

When the horizontal and vertical sync signals are summed together, the resulting summation sync waveform S1 will have three discreter states. That is, when both the horizontal and the vertical sync signals are both in the "1" state, the algebraic sum of that will be a "2". Similarly, when either of the horizontal and sync signals is in a "1" state while the other is in a "0" state, the resultant summation sync waveform S1 will be a "1" state. Likewise, when both the horizontal and vertical sync signals are in the "0" state, the resultant summation sync waveform S1 will be in the "0" state. These three "states" are illustrated by the three discrete levels of waveform S1.

Although in the preferred embodiment of the present invention, the horizontal and vertical sync signals are algebraically summed to obtain the tri-state, summation sync signal of waveform S1, the two original sync signal may be combined in any number of ways to produce an acceptable tri-state sync signal for transmitting combined synch information via a single transmission line.

In the present invention, a combined sync signal, having three discrete levels which may then be processed at a receiving station to separate and restore the original horizontal and vertical sync signals, is the desired intermediate waveform. This aspect of the present invention may be more fully understood by reference to the waveforms S1-S6 of FIG. 2 in conjunction with the circuit schematic of FIG. 3.

The schematic of FIG. 3 illustrates one embodiment of a combining circuit 14 for combining vertical and horizontal sync signals such as those shown in waveforms A and B. Generally, the circuit of FIG. 3 comprises paired transistors 38 and 40 which receive positive-going horizontal and vertical sync signals from lines 42 and 44, respectively, via base resistors 46 and 48, respectively. The resulting, negative-going combined sync signal is then developed on line 50 at the output of an optional, emitter follower, buffer circuit 52 (comprising transistor 54 and resistor 56). Resistors 58 and 60 with potentiometer 62 complete the illustrated combining circuit of FIG. 3.

In operation, the combining circuit embodiment of FIG. 3 may be utilized to develop each of waveforms S1-S6 of FIG. 2 at the output on line 50. Although the sync signals of waveforms A and B are negative-going sync signals, their phase relationship would be unchanged if they were to be inverted to form positive-going signals for inputs to the circuit of FIG. 3. Accordingly, they are included as illustrative, while waveforms S1-S6 represent actual output waveforms on line 50.

Waveform S1 results as an output when potentiometer 62 is set to a value equal to resistor 60. When potentiometer 62 has a value greater than zero, resistor 58 and potentiometer 62 form a voltage divider that lowers the voltage to the base of transistor 54 in emitter follower 52 whenever a positive horizontal sync pulse is received on line 42 to turn on transistor 38. Likewise, resistors 58 and 60 form a similar voltage divider network whenever a positive vertical sync pulse is received on line 44 to turn on transistor 40. At those times when a positive horizontal pulse is present on line 42 and a positive vertical pulse is present on line 44, the voltage level at the base of transistor 54 is lowered further. That is, when both of transistors 38 and 40 are "on," the voltage at the base of transistor 54, and correspondingly the output on line 50 is approximately determined by the voltage divider network of resistor 58 with the parallel combination of resistor 60 and potentiometer 62.

As described immediately above the circuit of FIG. 3 produces an output signal having three discrete and recognizable levels in response to the two two-state sync input signals. That is, when no sync pulses are present the output is approximately equal to B+. When only a vertical sync pulse or a horizontal sync pulse is present, the output is approximately equal to $(B+)(R3)/(R3+R1)$ or $(B+)(R2)/(R2+R1)$, where R3 is the adjusted resistive value of potentiometer 62, R2 is the resistive value of resistor 60 and R1 is the resistive value of resistor 58. Finally, when both vertical and horizontal sync pulses are present, the output is approximately $(B+)((R2)(R3)/R2+R3))/(R1+(R2)(R3)/(R2+R3)$, where R3, R2 and R1 are the respective resistive values listed above.

The remaining waveforms S2-S6 of FIG. 2 may be achieved as output signals on line 50 through various modifications of the circuit of FIG. 3. For example, waveform S2 will result when potentiometer 62 is set to zero resistance. The illustrated relationship of S2 to S1 is readily understood when R3=0 is substituted into the equations of the preceding paragraph.

Similarly, waveform S3 may be obtained as an output signal when R3=R2 and the vertical sync signal is inverted before it is applied via line 4 and resistor 48 to the base of transistor 40. This situation is similar to that when S1 is produced as an output, except that transistor 40 is now "on" during those periods in which the vertical sync pulse is not present and "off" during the vertical sync pulse period. This has the effect of changing the times at which the various equations given above are used to determine the output of the resistive, voltage divider network. That is, the output approximates B+ when a vertical sync pulse is present and a horizontal sync pulse is not. The output approximates $(B+)(R3)/(R1+R3)$ when a vertical sync pulse is present and a horizontal sync pulse is present. The output approximates $(B+)(R2)/(R1+R2)$ when a vertical sync pulse is not present and a horizontal sync pulse is not present. Finally, the output approximates $(B+)((R2)(R3)/(R2+R3))/(R1+(R2)(R3)/(R2+R3))$ when a vertical sync pulse is not present and a horizontal sync pulse is present.

Correspondingly, when R2 and R3 are both nonzero and not equal values, a four-state signal will result. It will be appreciated by those skilled in the art and familiar with this application that such a signal may be utilized in the present invention as it will have little or no effect on the decoding of the combined sync signal.

A modification of the circuit described immediately above results in waveform S6 as the output. When R3 is set equal to zero, the voltage divider network is again redefined (plug R3=0 into the immediately preceding equations) and S6 is produced.

As would be apparent to one skilled in the art and familiar with the teachings of this application, the circuit of FIG. 3 or other suitable combining circuit, may be further modified to produce different output signals such as those illustrated by waveforms S4 and S5 of FIG. 2. These waveforms S4 and S5, in conjunction with the other waveforms of FIG. 2 serve to point out the desired tri-state characteristics of the output combined sync signal for single line transmission. Each waveform has a minimum of at least three distinct levels as described above and the original horizontal phase relationship is preserved along with the synchronizing information itself. The three levels of the transmitted sync signal may then be utilized to separate the horizontal and vertical sync pulses for appropriate processing by a raster scan display module.

Referring now to FIG. 4, therein is shown a circuit schematic of one embodiment of decoding circuitry for use at a display station 18 for separating, or decoding, the horizontal and vertical sync components from the tri-state sync signal. More particularly, differentiator 20 as shown, comprises a capacitor 64 and a resistor 66. As mentioned above, differentiator 20 serves to separate the horizontal sync from the combined, tri-state sync signal and output the restored horizontal sync on a line 24 for further processing in a video monitor. As shown in FIG. 4, integrator 22 may comprise a resistor 68 and a capacitor 70. Integrator 22, as mentioned above, operates to separate the vertical sync component from the combined tri-state sync signal and output the restored vertical sync signal on a line 26 for further processing within a video monitor. Although the differentiator 20 and integrator 22 are shown in a preferred embodiment in FIG. 4, it is envisioned that any suitable integrating and differentiating circuit may be used to accomplish the appropriate functions at the display station 18. Likewise, although differentiating and integrating functions have been determined to be readily obtainable techniques for extracting the horizontal and vertical sync information, other techniques may be employed to recognize and separate the desired signals from the combined, tri-state sync signal.

Also shown in FIG. 4 is a zener diode 72 which may be used to clamp the horizontal sync output on line 24 about a desired DC voltage level. Any suitable clamping device may be used in place of zener diode 72 which is envisioned to be the desired device in a preferred embodiment of the present invention. The clamping device maintains the horizontal sync at about a desired DC level and prevents undue fluctuations in the restored horizontal sync signal.

Referring now to FIG. 5, therein is shown an expanded view of waveform S1 of FIG. 2, the transmitted summation or summed sync signal, as a waveform C as received by the display device 18 via transmission channel 16. The signals of waveform S1 in FIG. 2 and waveform C in FIG. 5 have three discrete DC voltage levels. Because of the action of blocking capacitor 64 in the circuit of FIG. 4, the lower DC level represented by the lengthy vertical sync pulse 36 will decay back toward the average DC level which is approximately that of a "1" state. It is at this level that the zener diode 72 may kick in to further clamp the horizontal sync signal outputted on line 24. A restored horizontal sync signal as may then be present on line 24 is illustrated by waveform D in FIG. 5. Waveform D illustrates the result of the decaying action of blocking capacitor 38 as the summed sync signal is passed through the capacitor 38 and decays back toward an average DC voltage level which approximates the DC level about at which horizontal sync would otherwise be centered.

As shown in waveform E, by the time the lengthy vertical sync period as defined by pulse 36 has ended, the horizontal sync signal on line 24 will have returned to about its normal DC level. A horizontal sync pulse present in the summed sync signal may then be recognized by a DC-level-triggered horizontal timing circuit. Accordingly, horizontal timing will be reestablished by the first horizontal sync pulse following the vertical period.

More specifically, in a typical horizontal flyback or timing circuity, a particular DC level is recognized in the sync signals to generate the appropriate horizontal sync signal. That is, prior to the initiation of the vertical sync period, the horizontal circuitry will recognize the negative-going sync edge of the horizontal sync signal which is represented by the horizontal sync pulses 74 and 76 in waveform D. However, once the vertical period is initiated, pulses 78, 80 and 82 of waveform D will be at a substantially lower average level due to the summation with the vertical sync pulse. Accordingly, the horizontal timing circuitry will typically not recognize these pulses. However, because of the decaying action of capacitor 64, by the time that horizontal sync pulse 84 occurs, the signal will have decayed to about that level at which the horizontal timing circuitry may recognize the negative-going sync edge and initiate the appropriate horizontal retrace signal. In the envisioned application of the present invention, if the clamp diode 72 is used, the horizontal timing circuitry will then recognize the first horizontal sync pulse 86 to occur in the horizontal sync signal after the termination of the vertical sync interval as defined by the vertical sync pulse 36, because of the clamping action shown by the dotted waveform at pulse 86. Thus, when the horizontal timing circuitry is set to trigger upon the negative-going edge of the horizontal sync pulses, it will trigger upon the negative-going edge of pulse 86 and will be accurately timed immediately following the termination of the vertical sync interval. Accordingly, when the present invention is utilized, there is no need for equalizing pulses to reestablish the horizontal timing upon the termination of the vertical sync interval.

Referring now to waveform E of FIG. 5, it can be seen that the summation technique of the present invention does not distort the vertical sync interval. Because the vertical sync may typically be recognized by the substantially lower average which is caused by the lengthy duration of the negative going pulse 36, the duration of the horizontal sync pulses which occur during the vertical interval will not typically be sufficient to cause the average DC level during that interval to decrease to a point which would cause it to be unrecognizable to the vertical retrace circuitry. That is, the occurrence of horizontal sync pulses 78, 80, 82 and 84 during the vertical sync pulse 36 will not distort the vertical interval.

Although the above description has been directed to the embodiment in which S1 is the output waveform, the present invention is equally applicable to the other waveforms. The illustrative circuit described above recognizes the three distinct levels of the combined sync signal and extracts or separates the horizontal and vertical sync information accordingly.

Both waveform D and waveform E may be "squared" by appropriate circuitry for further processing in a video monitor. However, it will be appreciated from FIG. 5 that the important timing information, the times at which the horizontal and vertical sync pulses follow, may be easily recognized even before any further "cleaning-up" or "squaring" of the waveforms.

Although the present invention has been described above in terms of a preferred embodiment, it is envisioned that such other embodiments, modifications and alterations as would be apparent to one of ordinary skill in the art and familiar with the teachings of this application would fall within the spirit and scope of the present invention as set forth in the appended claims.

What is claimed is:

1. In a scan display system having separate horizontal and vertical sync signals, a method for providing horizontal and vertical sync information via a single transmission channel to scan display apparatus at desired display stations comprising:
   combining said horizontal and vertical sync signals prior to transmission to generate a combined sync signal having three states representative of said horizontal and vertical sync information without equalizing pulses and in which the phase of said horizontal sync information during the vertical blanking interval is unchanged from the phase of said horizontal sync signal;
   transmitting said combined sync signal to the scan display apparatus at desired display stations over said single transmission channel;
   low pass filtering said combined sync signal to extract said vertical sync information for use by said scan display apparatus; and
   high pass filtering said combined sync signal to extract said horizontal sync information for use by said scan display apparatus.

2. The method of claim 1 wherein said horizontal and vertical sync signals comprise two-state horizontal and two-state vertical sync signals.

3. The method of claim 2 wherein said combining comprises summing said two-state horizontal and two-state vertical sync signals.

4. The method of claim 1 further including:
   clamping said extracted horizontal sync information at or about a desired DC level after high pass filtering.

5. In a scan display system utilizing separate horizontal and vertical sync signals, means for communicating horizontal and vertical sync information to at least one video display station for use by scan display apparatus over a single transmission channel comprising:
   combining means for combining said horizontal and vertical sync signals to generate a combined sync signal having three states representative of said horizontal and vertical sync information without equalizing pulses and in which the phase of said horizontal sync information during the vertical blanking interval is unchanged from the phase of said horizontal sync signal;
   transmission means for transmitting said combined sync signal to at least one video display station;
   first filter means for low pass filtering said combined sync signal to extract said vertical sync information for use by said scan display apparatus;
   second filter means for high pass filtering said combined sync signal to extract said horizontal sync information for use by said scan display apparatus.

6. The apparatus of claim 5 wherein said horizontal and vertical sync signals comprise two-state horizontal and two-state vertical sync signals.

7. The apparatus of claim 6 wherein said combining means comprises summing means for producing a summed sync signal representational of the sum of the magnitudes of said two-state horizontal and two-state vertical sync signals.

8. The apparatus of claim 5 wherein said means further comprises:
   clamping means for clamping said extracted horizontal sync information at or about a desired DC output level.

9. The apparatus of claim 8 wherein said clamping means comprises a zener diode.

10. In a scan display system utilizing separate horizontal and vertical sync signals, a method for providing horizontal and vertical sync information over a single transmission channel to at least one video display station for use by scan display apparatus and retaining horizontal sync phase information during vertical sync periods comprising:
    summing said horizontal and vertical sync signals prior to transmission to generate a summed, tri-state sync signal in which the horizontal sync information phase during the vertical blanking interval is unchanged from the phase of said horizontal sync signal;
    transmitting said summed, tri-state sync signal over a single transmission channel to said at least one video display station;
    low pass filtering said summed, tri-state sync signal at said at least one video display station to extract vertical sync information for use by said scan display apparatus; and high pass filtering said summed, tri-state sync signal at said at least one video display station to extract horizontal sync information for use by said scan display apparatus.

11. The method of claim 10 further including:

clamping said extracted horizontal sync information at or about a desired DC level after high pass filtering.

12. In a scan display system utilizing separate two-state horizontal and vertical sync signals, means for providing horizontal and vertical sync information over a single transmission channel to at least one video display station for use by scan display apparatus and retaining horizontal sync phase information during vertical sync periods comprising:

summing means for summing said two-state horizontal and vertical sync signals prior to transmission to generate a summed tri-state sync signal in which the horizontal sync phase during the vertical blanking interval is unchanged from the phase of said two-state horizontal sync signal;

transmission means for transmitting said summed, tri-state sync signal over a single transmission channel to said at least one video display station;

first filter means for low pass filtering said summed, tri-state sync signal at said at least one video display station to extract said vertical sync information; and second filter means for high pass filtering said summed, tri-state sync signal as said video display station to extract said horizontal sync information.

13. The apparatus of claim 12 further comprising:

clamping means for clamping said extracted horizontal sync information at said at least one video display station at about a desired DC level.

14. The apparatus of claim 13 wherein said clamping means comprises a zener diode.

* * * * *